(12) United States Patent
Altan et al.

(10) Patent No.: US 8,706,058 B2
(45) Date of Patent: *Apr. 22, 2014

(54) RF DATA TRANSFER IN A SPHERICAL CAVITY

(75) Inventors: Halil N. Altan, Heathrow, FL (US); Jamal Haque, Clearwater, FL (US); Curtis Goulbourne, Riverview, FL (US)

(73) Assignee: Honeywell International Inc., Morristown, NJ (US)

(*) Notice: Subject to any disclaimer, the term of this patent is extended or adjusted under 35 U.S.C. 154(b) by 170 days.

This patent is subject to a terminal disclaimer.

(21) Appl. No.: 13/070,725

(22) Filed: Mar. 24, 2011

(65) Prior Publication Data
US 2012/0244815 A1 Sep. 27, 2012

(51) Int. Cl.
*H04B 15/00* (2006.01)
*G01C 21/20* (2006.01)
*G01S 13/02* (2006.01)

(52) U.S. Cl.
USPC ............. 455/90.3; 455/9; 455/10; 455/67.11; 455/504; 455/506; 701/470

(58) Field of Classification Search
USPC .............. 455/90.3, 9, 10, 67.11, 504, 506, 455/91–92, 65, 66.1, 67.12, 550.1, 575.1, 455/434, 450, 513; 701/220, 1–5, 10, 14, 701/200, 202, 210, 216
See application file for complete search history.

(56) References Cited

U.S. PATENT DOCUMENTS

| 3,577,788 A | 5/1971 | Tischer |
| 3,722,295 A | 3/1973 | Passarelli, Jr. |
| 3,737,781 A | 6/1973 | Deerkoski |
| 4,290,316 A | 9/1981 | Noar et al. |
| 4,450,585 A | 5/1984 | Bell |

(Continued)

FOREIGN PATENT DOCUMENTS

| EP | 1037397 | 9/2000 |
| EP | 1848120 | 10/2007 |
| EP | 2299607 | 3/2011 |

OTHER PUBLICATIONS

European Patent Office, "European Search Report" from foreign counterpart of U.S. Appl. No. 13/070,750, mailed Jun. 25, 2012, Published in: EP.

(Continued)

*Primary Examiner* — Pablo Tran
(74) *Attorney, Agent, or Firm* — Fogg & Powers LLC

(57) ABSTRACT

A system comprises an outer shell having an inner spherical cavity and an inner sphere located in the spherical cavity. The inner sphere comprises a sensor; at least one transmit antenna; and at least one transmitter coupled to the sensor and to a respective one of the at least one transmit antenna. The system also comprises a first receive antenna located in the spherical cavity; a second receive antenna located in the spherical cavity; and a receiver located outside of the outer shell. The receiver is configured to determine the signal to noise ratio of a first signal received at the first receive antenna and the signal to noise ratio of a second signal received at the second receive antenna; and to combine the first and second signals based on the respective signal to noise ratios such that interference due to multi-path signals in the spherical cavity is reduced.

15 Claims, 5 Drawing Sheets

(56) References Cited

U.S. PATENT DOCUMENTS

| | | | |
|---|---|---|---|
| 4,953,197 A | 8/1990 | Kaewell, Jr. et al. | |
| 5,501,114 A | 3/1996 | Okamoto et al. | |
| 5,790,049 A * | 8/1998 | Harrell | 340/870.28 |
| 6,115,591 A | 9/2000 | Hwang | |
| 6,518,856 B1 | 2/2003 | Casale et al. | |
| 6,826,478 B2 * | 11/2004 | Riewe et al. | 701/470 |
| 6,853,694 B1 | 2/2005 | Beaudin et al. | |
| 7,003,399 B1 * | 2/2006 | Chappell | 701/500 |
| 7,103,325 B1 | 9/2006 | Jia et al. | |
| 7,116,703 B2 | 10/2006 | Bouillet et al. | |
| 7,274,439 B2 | 9/2007 | Kurth | |
| 7,340,344 B2 * | 3/2008 | Chappell | 701/500 |
| 7,366,613 B2 | 4/2008 | DuBois et al. | |
| 7,397,864 B2 | 7/2008 | Tarokh et al. | |
| 7,425,097 B1 | 9/2008 | Chappell et al. | |
| 7,499,691 B1 | 3/2009 | Dunn et al. | |
| 7,508,863 B2 | 3/2009 | Bachl et al. | |
| 7,630,696 B2 * | 12/2009 | Loyet | 455/137 |
| 7,647,176 B2 | 1/2010 | Hayek et al. | |
| 7,698,064 B2 * | 4/2010 | Chappell et al. | 701/500 |
| 7,762,133 B2 | 7/2010 | Chappell et al. | |
| 7,865,155 B1 * | 1/2011 | Smith | 455/137 |
| 7,876,849 B2 | 1/2011 | Gardner | |
| RE42,098 E | 2/2011 | Kim et al. | |
| 7,880,675 B1 | 2/2011 | Paschen et al. | |
| 7,899,405 B2 | 3/2011 | Han et al. | |
| 8,355,715 B2 * | 1/2013 | Rybicki et al. | 455/434 |
| 2004/0089083 A1 * | 5/2004 | Bailey | 74/5.4 |
| 2004/0208255 A1 | 10/2004 | Yoshida et al. | |
| 2006/0054660 A1 | 3/2006 | Chappell | |
| 2006/0058961 A1 | 3/2006 | Chappell et al. | |
| 2006/0073797 A1 * | 4/2006 | Kent et al. | 455/132 |
| 2008/0051046 A1 | 2/2008 | Ruckriem | |

OTHER PUBLICATIONS

European Patent Office, "Office Action" from Foreign Counterpart of U.S. Appl. No. 13/070,750, mailed Jul. 12, 2012, Published in: EP.

European Patent Office, "European Search Report", mailed Jun. 27, 2012, Published in: EP.

European Patent Office, "Office Action", mailed Jul. 12, 2012, Published in: EP.

, "Antenna Diversity", "Available at http://en.wikipedia.org/wiki/Antenna_diversity accessed Mar. 18, 2011", Feb. 6, 2011, pp. 1-4, Publisher: Wikipedia.

, "Diversity Combining", "Available at http://en.wikipedia.org/wiki/Diversity_combining accessed Mar. 18, 2011", Jun. 15, 2010, pp. 1-5, Publisher: Wikipedia.

Gold et al., "An Array of Digital Antenna Elements for Mitigation of Multipath for Carrier Landings", "Proceedings of ION 2005 National Technical Meeting", Jan. 2005, pp. 1-7, Publisher: NAVSYS Corporation, Published in: San Diego, CA.

* cited by examiner

RF DATA TRANSFER IN A SPHERICAL CAVITY

CROSS-REFERENCE TO RELATED APPLICATIONS

This application is related to U.S. patent application Ser. No. 13/070,750 entitled "TRIPLE REDUNDANT RF LINK SYSTEM" filed on even date herewith and which is referred to herein as the '160 application. The '160 application is hereby incorporated herein by reference.

BACKGROUND

In data communication systems, certain environments can cause multi-path signals to be received at the same receiver. In other words, copies of the signal radiated from a transmit antenna travel different paths to the receiver antenna. The different paths result in phase differences which causes interference and noise at the receiver antenna.

SUMMARY

In one embodiment, a system is provided. The system comprises an outer shell having an inner spherical cavity and an inner sphere located in the spherical cavity of the outer shell. The inner sphere comprises a sensor configured to obtain data; at least one transmit antenna configured to radiate signals at a transmit frequency; and at least one transmitter coupled to the sensor and to a respective one of the at least one transmit antenna, the at least one transmitter configured to control transmission of the sensor data via the respective at least one transmit antenna. The system also comprises a first receive antenna located in the spherical cavity of the outer shell, the first receive antenna frequency matched to the transmit frequency of a respective one of the at least one transmit antenna; a second receive antenna located in the spherical cavity of the outer shell; the second receive antenna frequency matched to the transmit frequency of a respective one of the at least one transmit antenna; and a receiver located outside of the outer shell, the receiver coupled to the first receive antenna and to the second receive antenna, wherein the receiver is configured to determine the signal to noise ratio of a first signal received at the first receive antenna and the signal to noise ratio of a second signal received at the second receive antenna; and to combine the first and second signals based on the respective signal to noise ratios such that interference due to multi-path signals in the spherical cavity is reduced.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
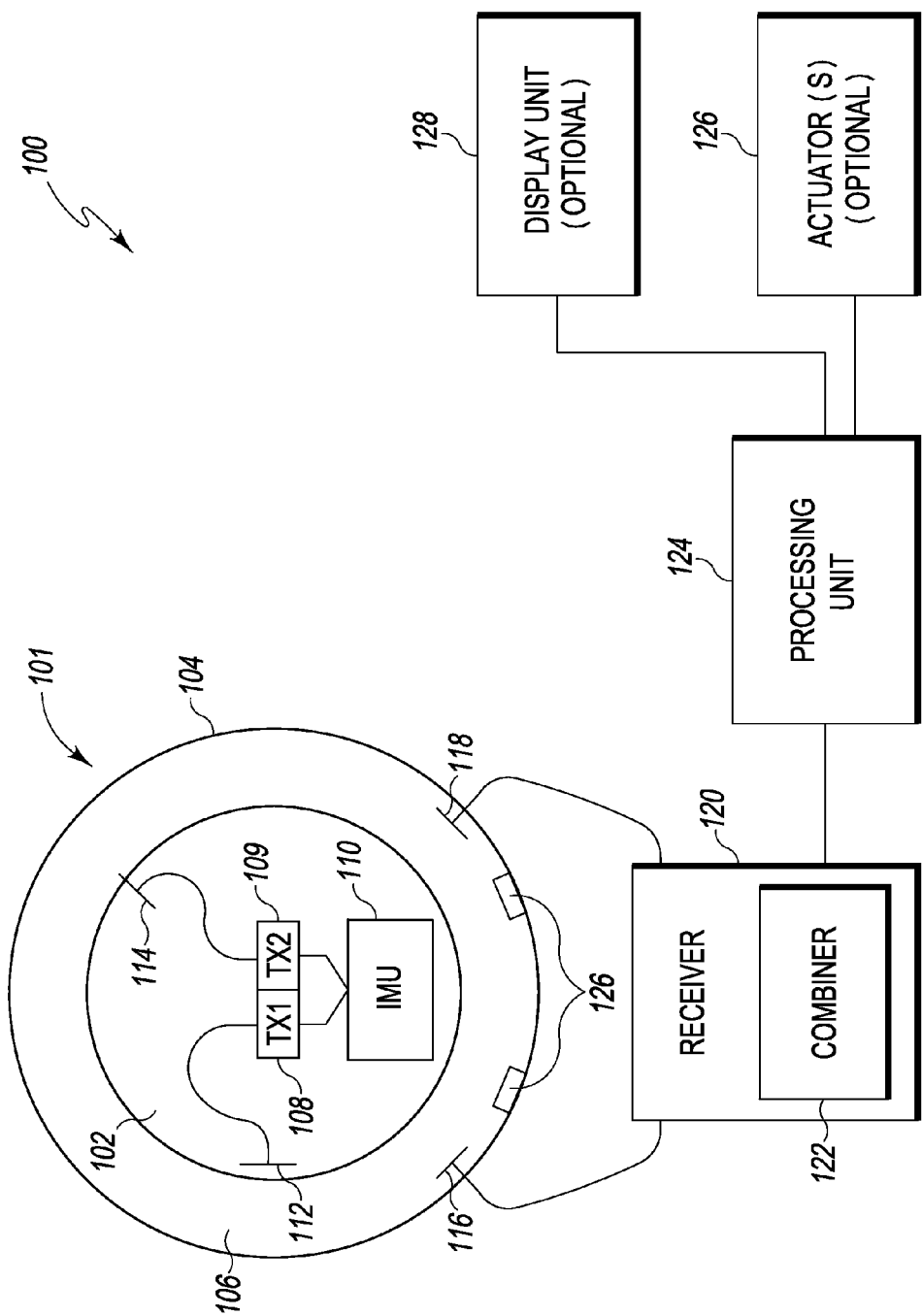
FIG. 1A is a block diagram of one embodiment of a data transfer system having a spherical cavity.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a block diagram of an exemplary embodiment of a sensor system 100. The sensor system 100 includes a sensor unit 101 that has a spherical cavity 106 through which data is transferred. In particular, the sensor unit 101 includes an inner sphere 102 and an outer shell 104. The outer shell 104, in this embodiment, is also spherical. However, it is to be understood that the outer shell 104 can also be implemented with other configurations. For example, the outer shell 104 can be implemented with a square outer surface and a spherical inner surface that forms the spherical cavity 106 into which the inner sphere 102 is deposited. The inner sphere 102 is suspended inside the outer shell 104 such that the outer surface of the inner sphere 102 does not contact the inner surface of the outer shell 104. Thus, the inner sphere 104 is capable of rotating in any direction. For example, the inner sphere 104 is supported by bearings 126, such as gas bearing pads described in U.S. Patent Application Publication No. 2006/0054660, which is hereby incorporated herein by reference. However, the inner sphere 104 can also be separated from the outer shell 106 by ball bearings, in other embodiments. Exemplary configurations of the inner sphere 102 and outer shell 104 are described in more detail in U.S. Pat. No. 7,698,064, which is hereby incorporated herein by reference.

In the exemplary embodiment of FIG. 1, the inner sphere 102 includes a sensor 110, a first transmitter 108, and a second transmitter 109. In this example, the sensor 110 is implemented as an inertial measurement unit (IMU) having one or more linear accelerometers and/or one or more gyroscopes. However, it is to be understood that other sensor types can be used in other embodiments. For example, in other embodiments, the sensor 110 can be implemented as a health monitoring sensor which monitors the status of the components located in the inner sphere 102.

The sensor 110 provides data to the transmitters 108 and 109 for transmission through the spherical cavity 106. In particular, the sensor 110 provides the same data to both transmitters 108 and 109. The transmitters 108 and 109 control modulation of a signal radiated from transmit antennas 112 and 114, respectively. The antenna 112 is configured to radiate signals at a first frequency and the antenna 114 is configured to radiate signals at a second frequency. In some embodiments, the first and second frequencies are the approximately the same frequency. In other embodiments, the first and second frequencies are different. For example, in some embodiments, the first and second frequencies are spaced at least 500 KHz apart. The first and second frequencies can be located in any appropriate radio frequency band such as the Ultra High Frequency (UHF) band, S-band, or L-band.

Also located inside the spherical cavity 106 are receive antennas 116 and 118. For example, in some embodiments, the receive antenna 116 is located in a position that is orthogonal to the position of the receive antenna 118. That is, the receive antennas 116 and 118 can be placed 90 degrees apart for parallel-to-surface antennas.

Receive antenna 116 is frequency matched to the first frequency of transmit antenna 112. Similarly, receive antenna 118 is frequency matched to the second frequency of transmit antenna 114. Due to the spherical cavity 106 and movement of the inner sphere 102 in the spherical cavity 106, each of receive antennas 116 and 118 receives multiple versions of the same signal, each version travelling a different path. The multi-path signals received at each antenna 116 and 118 can cause increased noise or interference in the signal received. In addition, as the inner sphere 102 moves within the spherical cavity 106, one of the receive antennas 116 or 118 can be blocked by other components in the spherical cavity 106 which further reduces the signal to noise ratio.

However, since the signals transmitted by the transmit antennas 112 and 114 are redundant, when one of the receive antennas 116 or 118 is blocked, the other antenna 118 or 116 located to be off-centered from the blocking component. Furthermore, the receiver 120 coupled to the receive antennas 116 and 118 is configured to mitigate the interference effects of the multi-path signals. In particular, the receiver 120 includes a combiner 122 configured to combine the signal received at antenna 116 with the signal received at antenna 118. Since the signals are duplicate copies of each other, the signals will combine constructively. However, the non-coherent noise will not add up which results in improved signal to noise ratio of the combined signal.

In some embodiments, a simple addition of the two signals is performed to combine the received signals. In other embodiments, a weighted combination is performed. In particular, the weights can be dynamically determined based on the respective signal to noise ratio of the signals such that the signal with a larger signal to noise ratio is weighted more in the combination than the signal with the smaller signal to noise ratio.

Alternatively, in some embodiments, the combiner 122 is configured to select one of the signals from receive antenna 116 and 118 rather than combining them if the signal to noise ratio of one of the signals is sufficiently better than the signal to noise ratio of the other. For example, if the signal to noise ratio of the signal received via antenna 116 is sufficiently better than the signal to ratio of the signal received via antenna 118, the combiner 122 is configured to select the signal received via antenna 116 rather than combining the two signals. In some embodiments, the difference between the respective signal to noise ratios is compared to a threshold. If the difference exceeds the threshold, then the signal having the larger signal to noise threshold is selected to be output for further processing. If the difference does not exceed the threshold, then the combined signal is selected to be output for further processing.

The receiver 120 outputs the selected signal to a processing unit 124. The processing unit 124 uses the selected signal from the receiver 120 for additional processing depending on the implementation of the sensor 110. For example, in some embodiments, the sensor 110 is an IMU that outputs inertial navigation data which is used by the processing unit 124 in calculating navigation parameters. The navigation parameters can be output to a display unit 128 for display to a user. In addition, the navigation parameters can be commands output to one or more actuators to control movement of a vehicle in which the sensor system 100 is located. The implementation of the actuators is dependent on the vehicle. For example, in an aircraft, the processing unit can output commands to control engine thrust, wing flaps, etc. It is to be understood that implementations of the sensor system 100 are not to be limited to navigation sensors and data and that other sensor systems can communicate other data from the sensor 110 to the receiver 120 via the spherical cavity 106.

Figure 1B:
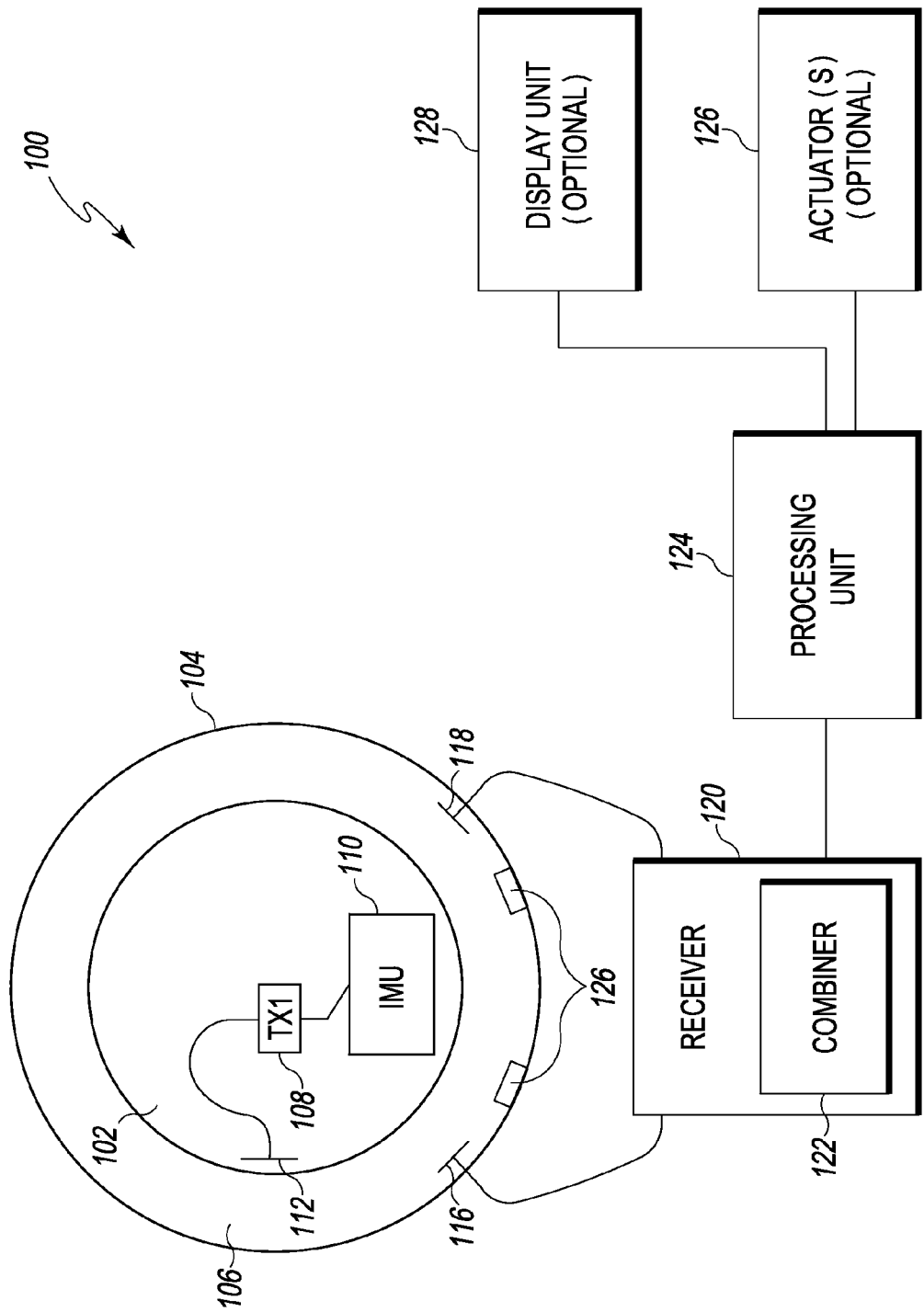
FIG. 1B is a block diagram of another embodiment of a data transfer system having a spherical cavity.

FIG. 1B is another embodiment of the sensor system 200 having a spherical cavity 106. The components of sensor system 100 are similar to the components described above with respect to FIG. 1A. However, in the embodiment shown in FIG. 1B, the inner sphere 102 includes a single transmitter 108 and corresponding transmit antenna 112. Hence, rather than two separate transmit antennas each with a corresponding frequency, the system 200 in FIG. 1B utilizes a single transmitter and transmit antenna. Thus, each of the receive antennas 116 and 118 are frequency matched to the transmit antenna 112 in this example.

Figure 2:
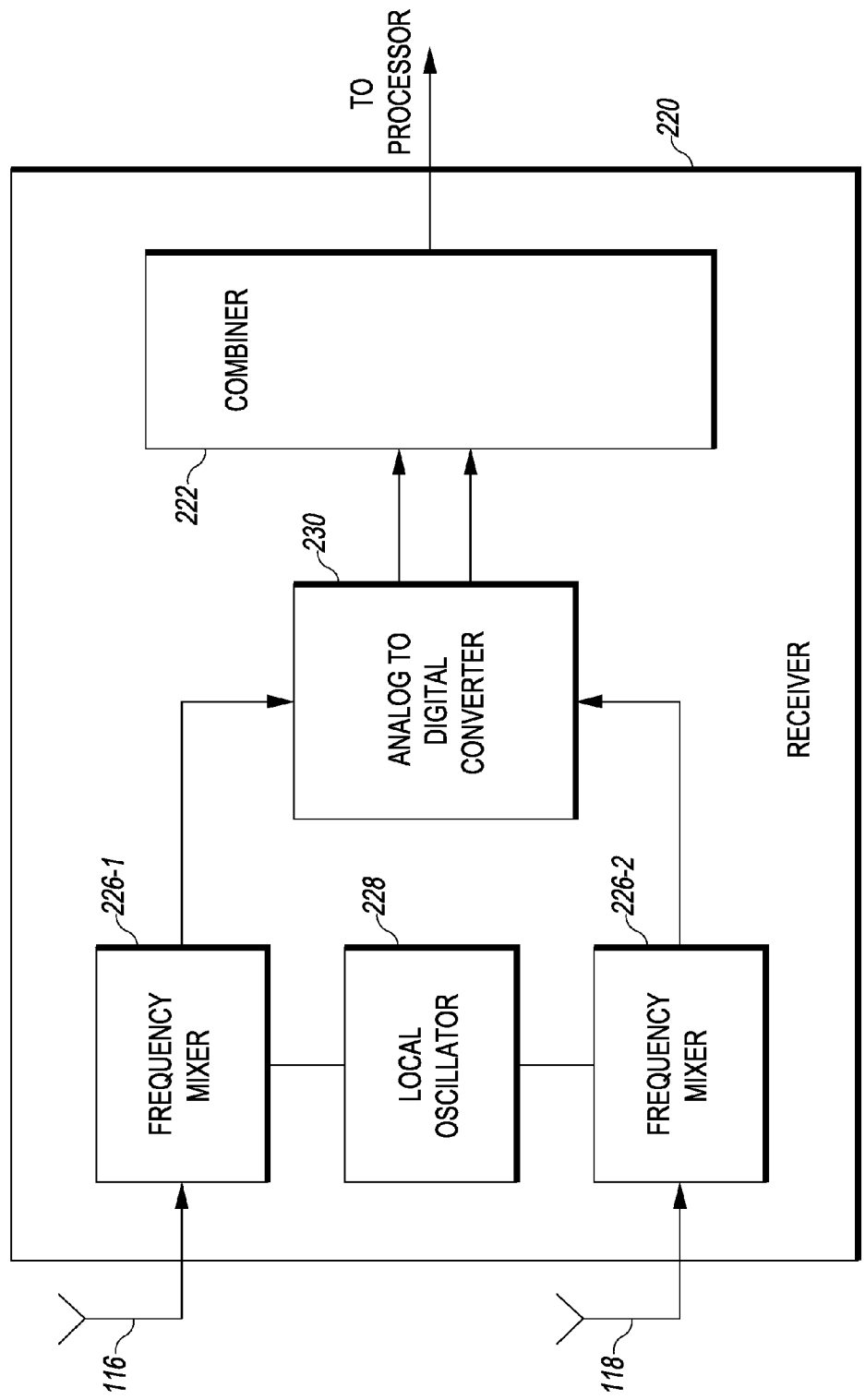
FIG. 2 is a block diagram of one embodiment of a receiver in a data transfer system.

FIG. 2 is a simplified block diagram of one embodiment of a receiver 220 used in the sensor system 100 described above. Receiver 220 includes a frequency mixer 226-1 coupled to receive antenna 116 and a frequency mixer 226-2 coupled to receive antenna 118. Frequency mixers 226-1 and 226-2 are configured to downconvert the RF signal received at the respective receive antenna to an intermediate frequency (IF) based on a signal from a common local oscillator 228. Thus, since the local oscillator 228 is coupled to both frequency mixers, the frequency mixers 226-1 and 226-2 are configured to downconvert the received RF signals to the same intermediate frequency and phase. However, in other embodiments, each frequency mixer 226-1 and 226-2 is coupled to a separate local oscillator. In such embodiments, the separate local oscillators are synchronized such that the frequency mixers 226-1 and 226-2 downconvert the RF signals to the same intermediate frequency and phase.

In the example shown in FIG. 2, the IF signals are output from the frequency mixers 226-1 and 226-2 to an analog to digital converter (ADC) 230. The ADC 230 is configured to convert the analog IF signals to a digital signal. The digital signals are then output from the ADC 230 to the combiner 222. The combiner 222 can be implemented as a digital signal processor (DSP) configured to combine the digital signals. As described above.

Figure 3:
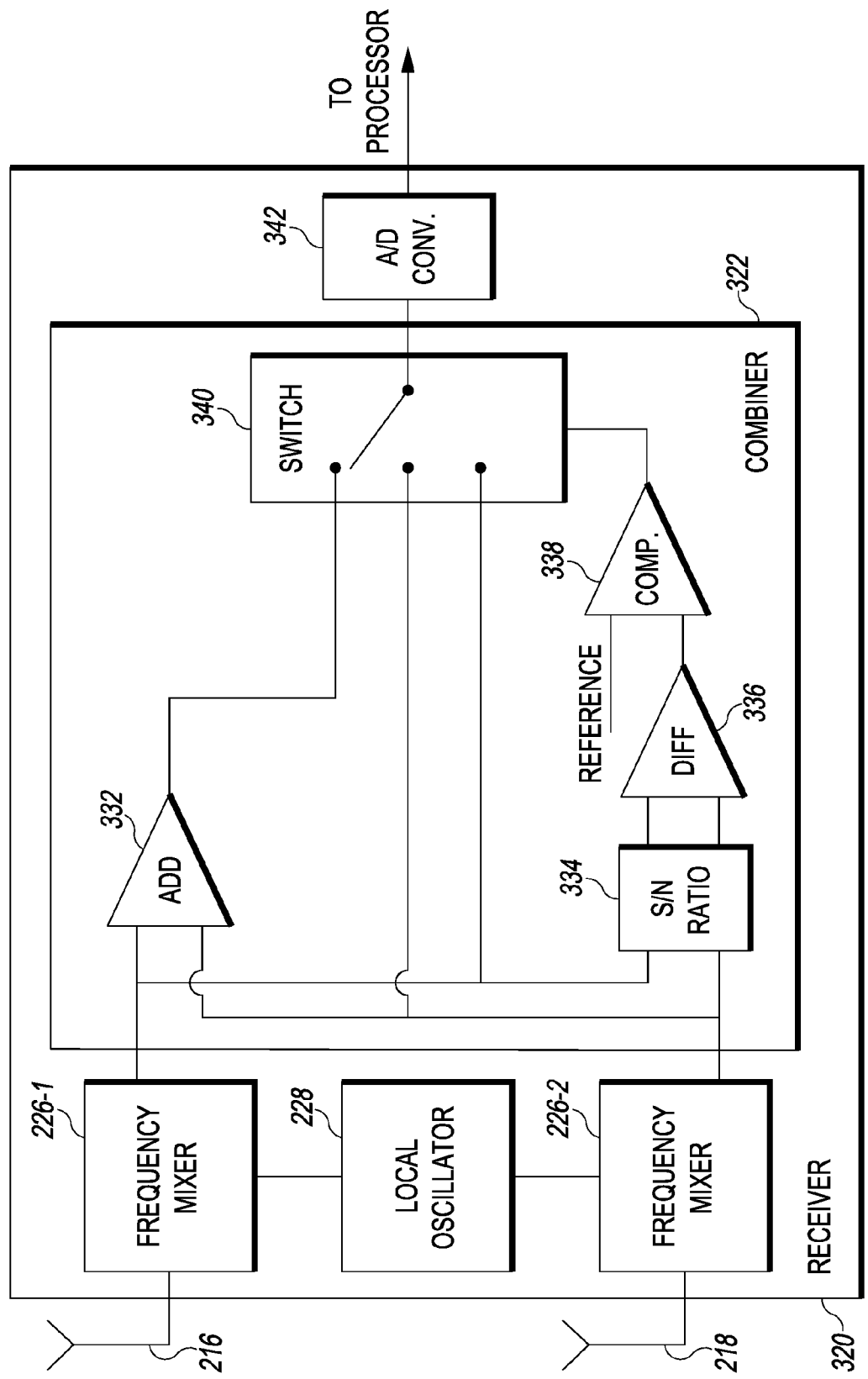
FIG. 3 is a block diagram of another embodiment of a receiver in a data transfer system.

It is to be understood that the receiver 220 described above is provided by way of example and not by way of limitation. In particular, implementations of the receiver 220 can include additional or different components not described above. For example, FIG. 3 is a simplified block diagram of another embodiment of a receiver 320.

The exemplary receiver 320 is configured to process the received RF signals as analog signals. In particular, the receiver 320 downconverts the RF signals to the same intermediate frequency, as described above. The receiver 320 then combines the downconverted signals using analog components known to one of skill in the art, such as comparators and switches. In particular, in the example shown in FIG. 3, the combiner 322 includes an adder 332 configured to sum the downconverted signals. The combiner 322 also includes a circuit 334 for determining the signal to noise ratio of each of the downconverted signals. The circuit 334 outputs the respective signal to noise ratios to a subtractor 336 which determines the difference between the respective signal to noise ratios. The determined difference is output from the substractor 336 to a comparator 338 which compares the difference to a reference or threshold value. The output of the comparison is used to control a switch 340. In this example, the switch is a single pole, triple throw (SPTT) switch which selects between one of the downconverted signals and the combined signal based on the result of the comparison in comparator 338. In particular, if the difference is less than the reference value, then the switch 340 selects the combined signal. If the difference is greater than the reference value, then the switch 340 selects the downconverted signal having the larger signal to noise ratio. It is to be understood that the components described in FIG. 3 are provided by way of example and that other configurations and/or components are used in other embodiments.

Figure 4:
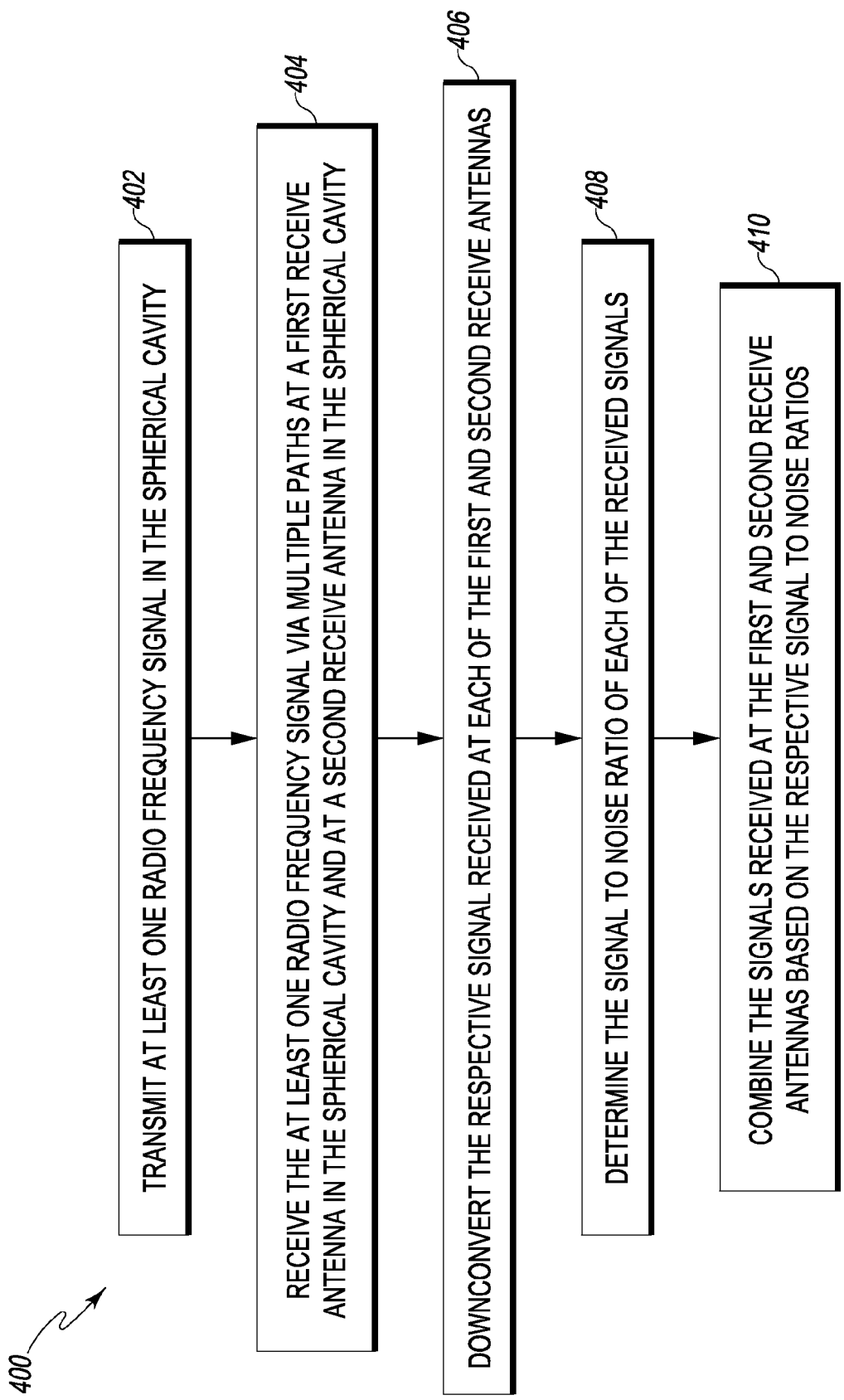
FIG. 4 is a flow chart depicting one embodiment of a method of transferring data in a system having a spherical cavity.

FIG. 4 is a flow chart depicting an exemplary method 400 of transferring data through a spherical cavity. The method 400 can be implemented by a system such as system 100 discussed above. At block 402, at least one radio frequency signal is transmitted in the spherical cavity. For example, in some embodiments a radio frequency signal is transmitted from a single antenna in the spherical cavity. In other embodiments, a first radio frequency signal is transmitted from a first antenna at a first frequency and a second radio frequency signal is transmitted from a second antenna at a second frequency. In some such embodiments, the first and second frequencies are the same frequency. In other such embodiments, the first and second frequencies are separated by a predetermined amount, such as, but not limited to, 500 KHz.

At block 404, the at least one radio frequency signal is received via multiple paths at a first receive antenna in the spherical cavity and at a second receive antenna in the spherical cavity. At block 406, the respective signal received at each of the first and second receive antennas is downconverted to the same intermediate frequency signal. At block 408, the signal to noise ratio of each of the downconverted signals is determined. At block 410, the signals received at the first and second receive antennas are combined based on the respective signal to noise ratios. For example, in some embodiments, the signals are summed together if the difference between the respective signal to noise ratios is less than a threshold value. If the difference is greater than the threshold value, the signal having the larger signal to noise ratio is output. In other embodiments, the signals are weighted based on the respective signal to noise ratio such that the signal with the larger signal to noise ratio receives a greater weight in the combined signal.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:
an outer shell having an inner spherical cavity;
an inner sphere located in the spherical cavity of the outer shell, the inner sphere comprising:
a sensor configured to obtain data;
at least one transmit antenna configured to radiate signals at a transmit frequency; and
at least one transmitter coupled to the sensor and to a respective one of the at least one transmit antenna, the at least one transmitter configured to control transmission of the sensor data via the respective at least one transmit antenna;
a first receive antenna located in the spherical cavity of the outer shell, the first receive antenna frequency matched to the transmit frequency of a respective one of the at least one transmit antenna;
a second receive antenna located in the spherical cavity of the outer shell; the second receive antenna frequency matched to the transmit frequency of a respective one of the at least one transmit antenna; and
a receiver located outside of the outer shell, the receiver coupled to the first receive antenna and to the second receive antenna, wherein the receiver is configured to determine the signal to noise ratio of a first signal received at the first receive antenna and the signal to noise ratio of a second signal received at the second receive antenna; and to combine the first and second signals based on the respective signal to noise ratios such that interference due to multi-path signals in the spherical cavity is reduced;
wherein a position of the first receive antenna and a position of the second receive antenna in the spherical cavity are selected such that when one of the first and second receive antennas is blocked by a component in the spherical cavity, the other of the first and second receive antennas is off-centered from the blocking component.

2. The system of claim 1, wherein the receiver is configured to combine the first and second signals based on the respective signal to noise ratios by:
determining a difference between the signal to noise ratio of the first signal and the signal to noise ratio of the second signal;
comparing the difference with a threshold;
outputting a combined signal comprising a sum of the first and second signals if the difference is less than the threshold;
outputting the first signal if the first signal has a larger signal to noise ratio than the second signal and the difference is greater than the threshold; and
outputting the second signal if the second signal has a larger signal to noise ratio than the first signal and the difference is greater than the threshold.

3. The system of claim 1, wherein the receiver is configured to combine the first and second signals based on the respective signal to noise ratios by assigning a weight to each of the first and second signals based on the respective signal to noise ratio; and summing the weighted first and second signals.

4. The system of claim 1, wherein the at least one transmit antenna comprises:
a first transmit antenna configured to radiate signals at a first transmit frequency; and
a second transmit antenna configured to radiate signals at a second transmit frequency; and
wherein the at least one transmitter comprises a first transmitter coupled to the first transmit antenna and a second transmitter coupled to the second transmit antenna;
wherein the sensor is configured to provide approximately the same data to each of the first and second transmitters.

5. The system of claim 4, wherein the first transmit frequency is different from the second transmit frequency.

6. The system of claim 5, wherein the first transmit frequency and the second transmit frequency are separated by at least 500 KHz.

7. The system of claim 1, wherein the first and second receive antennas are located orthogonally to one another in the spherical cavity.

8. The system of claim 1, wherein the sensor is an inertial measurement unit.

9. The system of claim 1, further comprising:
a processing unit coupled to the receiver and configured to process signals output from the receiver; and
a display unit coupled to the processing unit and configured to display data output from the processing unit.

10. A method of transferring data through a spherical cavity, the method comprising:
- transmitting a radio frequency signal from at least one transmit antenna in the spherical cavity;
- receiving the at least one radio frequency signal via multiple paths at a first receive antenna in the spherical cavity and at a second receive antenna in the spherical cavity;
- determining the signal to noise ratio of the signal received at the first receive antenna and of the signal received at the second receive antenna;
- combining the signals received at the first and second receive antennas based on the respective signal to noise ratios such that interference due to the multiple paths in the spherical cavity is reduced;
- wherein the first receive antenna is located at a position in the spherical cavity relative to the position of the second receive antenna such that when one of the first and second receive antennas is blocked by a component in the spherical cavity, the other of the first and second receive antennas is off-centered from the blocking component.

11. The method of claim 10, wherein combining the signals comprises:
- determining a difference between the signal to noise ratio of the signal received at the first receive antenna and the signal to noise ratio of the signal received at the second receive antenna;
- comparing the difference with a threshold;
- outputting a combined signal comprising a sum of the signals received at the first and second receive antennas if the difference is less than the threshold;
- outputting the signal received at the first receive antenna if the signal received at the first receive antenna has a larger signal to noise ratio than the signal received at the second receive antenna and the difference is greater than the threshold; and
- outputting the signal received at the second receive antenna if the signal received at the second receive antenna has a larger signal to noise ratio than the signal received at the first receive antenna and the difference is greater than the threshold.

12. The method of claim 10, wherein combining the signals comprises:
- assigning a weight to the signal received at the first receive antenna based on the respective signal to noise ratio;
- assigning a weight to the signal received at the second receive antenna based on the respective signal to noise ratio; and
- summing the signals based on the assigned weights.

13. The method of claim 10, wherein transmitting a radio frequency signal from at least one transmit antenna comprises:
- transmitting a first radio frequency signal from a first transmit antenna at a first radio frequency; and
- transmitting a second radio frequency signal from a second transmit antenna at a second radio frequency;
- wherein the first receive antenna is frequency matched to the first transmit antenna and the second receive antenna is frequency matched to the second transmit antenna.

14. The method of claim 13, wherein the first radio frequency is different from the second radio frequency.

15. The method of claim 14, wherein the first radio frequency and the second radio frequency are separated by at least 500 KHz.

* * * * *